United States Patent
Richtsmeier et al.

(10) Patent No.: US 6,309,041 B1
(45) Date of Patent: *Oct. 30, 2001

(54) ODD NUMBER OF PASSES, ODD NUMBER OF ADVANCES, AND SEPARATED-DIAGONAL-LINE MASKING, IN LIQUID-INK PRINTERS

(75) Inventors: Brent W. Richtsmeier, San Diego, CA (US); Mark Stephen Hickman, Vancouver, WA (US); William D. Meyer, Ramona, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/595,428

(22) Filed: Jun. 15, 2000

Related U.S. Application Data

(63) Continuation of application No. 08/825,170, filed on Mar. 26, 1997, now Pat. No. 6,106,102, which is a continuation of application No. 08/057,576, filed on Apr. 30, 1993, now abandoned, which is a continuation-in-part of application No. 07/877,905, filed on May 1, 1992, now Pat. No. 5,376,958, which is a continuation-in-part of application No. 07/878,958, filed on May 4, 1992, now Pat. No. 5,276,467.

(51) Int. Cl.$^7$ ........................................................ B41J 2/07
(52) U.S. Cl. .............................................. 347/12; 347/41
(58) Field of Search ................................ 347/41, 40, 43, 347/12

(56) References Cited

U.S. PATENT DOCUMENTS

| 4,320,406 | * | 3/1982 | Heinzl | 347/43 |
| 4,511,907 | * | 4/1985 | Fukuchi | 347/43 X |
| 4,833,491 | * | 5/1989 | Rezanka | 347/43 |
| 6,106,102 | * | 8/2000 | Richtsmeier et al. | 347/41 |

FOREIGN PATENT DOCUMENTS

| 3-234679 | * | 10/1991 | (JP) | B41J/2/21 |

* cited by examiner

Primary Examiner—David F. Yockey
(74) Attorney, Agent, or Firm—Jerry R. Potts

(57) ABSTRACT

Methods of printing a desired color image on a printing medium by construction from individual ink drops deposited in pixel arrays includes passing a multiple-nozzle ink-discharging pen or an odd number of staggered pen cartridges across the medium multiple times, each pass creating a portion of a respective segment of the image, and periodically advancing the medium so that portions of successively different segments are created by the pen(s). During each pass, the "portion-creating" function includes discharging from the pen(s) an odd submultiple of the full density of ink desired in the segment of the desired image that is being created, so that printing full density in each segment requires an odd number of passes. The medium is advanced by an odd submultiple of the height of the segment being created in each pass and is preferably advanced after each pass of the pen(s). The portion-creating includes creation by the pen(s) of a multiplicity of spaced-apart diagonal lines. Preferably in each passing step after a first one, the diagonal lines are created in positions such as to at least partially fill in unprinted spaces between previously created diagonal lines. Preferably the diagonal lines are all at a substantially common angle (ideally forty-five degrees) to a pen-scanning direction.

13 Claims, 2 Drawing Sheets

ODD NUMBER OF PASSES, ODD NUMBER OF ADVANCES, AND SEPARATED-DIAGONAL-LINE MASKING, IN LIQUID-INK PRINTERS

RELATED PATENT DOCUMENTS

This is a continuation of application Ser. No. 08/825,170 filed on Mar. 26 1997, now U.S. Pat. No. 6,106,102 which is a continuation of Ser. No. 08/057,576 filed Apr. 30, 1993.

This is a continuation-in-part of U.S. utility-patent applications Ser. Nos. 07/877,905 and 07/878,958, filed respectively on May 1 and 4, 1992, and now issued as U.S. Pat. Nos. 5,376,958 and 5,276,467—and both hereby incorporated by reference in their entirety into this document.

Three other related documents are coowned U.S. utility-patent applications filed in the United States Patent and Trademark Office substantially contemporaneously with this document—and also hereby incorporated by reference in their entirety into this document. One is in the names of Ronald A. Askeland et al., and identified as Hewlett Packard Company docket number PD-1093053-1, and entitled "INKING FOR COLOR-INKJET PRINTERS, USING NONINTEGRAL DROPS, MEDIA-DEPENDENT INKING, OR MORE THAN 2 DROPS/PIXEL"—and subsequently assigned utility-patent application Ser. No. 08/056,263, and issued as U.S. Pat. No. 5,485,180 on Jan. 16, 1996. Another such document is in the names of Gregory D. Raskin et al., and entitled "ENCODER-SIGNAL INVERSION: DECREMENTATION, DELAY, & TIMING UNCERTAINTY FOR IMPROVED BIDIRECTIONAL INKJET PRINTING"—and subsequently assigned utility-patent application Ser. No. 08/055,658, and issued as U.S. Pat. No. 5,519,415 on May 21, 1996. A third such document is in the name of Lance Cleveland and entitled "MAXIMUM-DIAGONAL PRINT MASK AND 6-PASS PRINTING MODES, FOR HIGH QUALITY AND HIGH THROUGHPUT WITH LIQUID-BASE INKS"—and given utility-patent application Ser. No. 08/056,633 and issued as U.S. Pat. No. 5,677,716 on Oct. 14, 1997.

BACKGROUND

1. Field of the Invention

This invention relates generally to printing desired color images on printing media by construction from individual ink drops deposited in pixel arrays; and more particularly to systems in which a multiple-nozzle ink-discharging pen passes across a printing medium multiple times, each time creating a portion of a respective segment of a desired image, and in which the medium is periodically advanced so that the pen can create portions of successively different segments.

2. Prior Art

U.S. Pat. No. 4,748,453 of Lin et al. introduces one representative basic mechanism for a printing machine that uses liquid inks and pixel-array or -matrix construction of images. Lin also describes a basic problem of so-called "beading" on transparency stock, and reviews prior solutions to that problem.

Lin's system provides another relatively early solution. His system prints in alternation two complementary checkerboard patterns, in which each unit of each checkerboard pattern is an approximately circular ink spot—of diameter approximating a diagonal of an individual cell of the checkerboard pattern.

That system is said to avoid overlap of deposited ink that is still wet. While very useful, Lin's approach provides only modest mitigation of the general drying problem when considered in view of modern demands for even higher throughput (area printed per unit time, for example number of pages per minute) and even higher image quality.

More specifically, while Lin set out to deter beading and banding—by preventing the inking of adjacent pixels with resultant puddling of the deposited ink—actually he did not entirely achieve those goals. Among other reasons, statistical variations between various ink-spot positions allow a certain amount of overlapped-spot printing to continue to occur, along diagonals of the checkerboard pattern.

The two-dimensionally connected character of Lin's checkerboard patterns tends to aggravate this residual puddling. That is to say, his checkerboard-style grids offer a relatively large number of pathways over which ink in diagonally adjacent positions can run together.

One of the present inventors has disclosed—see U.S. Pat. Nos. 4,963,882 and 4,965,593, coowned with the present document—fundamental later-generation techniques for enhancing throughput and quality in analogous machines. The '882 patent describes dual statistical benefits of using different nozzles to lay down plural ink drops in each pixel, and also in each row of pixels.

One of these benefits is in better averaging of ink-spot location and quality while all the nozzles are operating normally; and another is in a tendency to conceal individual-nozzle failure—and thereby permit operation with only slightly diminished apparent print quality despite such failure. These benefits accrue from what that earlier patent calls "double-drop always" inking.

More specifically, for each row some pixels are filled by one nozzle in a first pass, and some by another nozzle in a second pass—and if there are four passes then some other pixels by still another nozzle in a third pass, and by yet another in a fourth pass. Since different nozzles have different imperfections—either directional errors or variations in volume etc.—and since these imperfections tend to be randomly scattered within tolerances about some mean, then contributions to each row by two or more different nozzles tend to cause errors to average out in the composite result.

This technique thereby strongly suppresses an objectionable tendency of virtually all early-generation computerized systems for forming images, sounds etc. that are subject to esthetic evaluation—namely, that irregularities tend to be too highly patterned, or regularized, and accordingly seem artificial. Analogously, when an individual nozzle fails entirely so that it is not providing any inking at all in its pixel row, nevertheless its complementary nozzle is most likely to be still working so that at least some inking does occur in that row.

The '882 patent teaches various ways in which different nozzles can be caused to provide inking, as mentioned above, for a particular pixel or row of pixels. One way is to use plural pens; another suggested way is to use plural nozzle sets aligned along the scan axis.

Still another way is by using overlapping pen swaths—in other words, by advancing the printing medium, between pen scans, by some distance less than the height of the nozzle array (or at any rate the effective height, i. e. the height of that part of the array which is in use) along the direction of printing-medium advance. The teaching of the '882 patent relates to use of such over-lapping pen swaths to permit deposition of what might be called redundant sets of ink drops—that is, more than one drop at each individual pixel location—from different nozzles, to obtain the benefits of double-drop-always inking.

The '593 patent discloses use of nozzle spacings, in orthogonal directions (pen-scan and medium-advance directions respectively), that are two different integral multiples of the pixel-grid spacing; the ratio of the two integral multiples is an irreducible fraction. This technique helps to ensure that no adjacent pixels are printed within a time period less than the "fixing time of the colorant on the printing medium".

Yet another seminal patent coowned with the present document is U.S. Pat. No. 4,967,203 of Doan et al., which introduces two major advances in this field. One of these is the use of overlapping pen swaths to provide complementary parts of each image segment.

In this technique, as in that of the '882 patent, overlapping swaths are formed by advancing the medium through a distance which is less than the effective height of the nozzle array on the pen, and accordingly less than the height of a segment of the image which can all be produced in one pass of the pen. In this case, however, within each segment later-arriving nozzles are used not to provide statistical enhancement or nozzle-failure backup for pixel locations nominally inked previously, but rather to fill in pixel locations nominally left uninked previously.

Such a system very greatly improves the apparent quality of printed images, notwithstanding imperfections in manufacturing tolerances of a printing-medium advance mechanism. The system achieves this improvement by reducing the amount of positioning error which is allowed to accrue between steps of the advancing mechanism, and also by hiding the edges of every pen swath within the boundaries of one or more other (earlier and later) swaths.

In addition, both the '882 and the Doan '203 patent techniques offer an important benefit in spreading the inking process, for each image segment, over more than one pen pass. Generalizing the teachings of the Lin patent, the '593 patent and others, it is now recognized as highly beneficial to spread the inking over as many pen passes as possible, so that ink spots deposited in each pass have time to at least become tacky before adjacent and possibly slightly overlapping spots are created.

Such inking distribution as between passes is beneficial in that it promotes maximum ink deposition per unit area—and thereby in turn promotes well-saturated, intense colors and broadest possible color gamut—while maintaining throughput as high as practical. On the other hand it is also recognized that, unfortunately, increasing the number of passes per pen swath tends to decrease throughput.

Inasmuch as competitive commercial pressures for both high throughput and all aspects of image quality continue to drive machine design, it will be understood that every newly discovered way to spread inking between pen passes is a valuable opportunity. It is particularly important, however, to find ways to spread inking as between passes without unduly increasing the overall number of passes per pen swath.

These two applications (redundant and complementary inking) of the overlapping-swath principle both are taught—and have been practiced—in terms of (1) laying down in each pass of the pen some fraction of the total amount of ink to be used in the desired image, and (2) advancing the printing medium between passes of the pen by some fraction of the nozzle height. In both cases, moreover, the fraction is one half, or to put in another way the density per pass and advance per pass are both a submultiple of the total density and nozzle height, respectively, and that submultiple is the second; or in other words the value of the submultiple is two.

Heretofore the submultiple values of full density and medium advance have been either two or some other even number (most usually an integral power of two) and within each system have been the same value—that is, the same as each other.

The Doan patent alio introduces the use of so-called "superpixels", which are individual-pixel assemblages treated for color-rendering purposes as an elementary. color unit. Superpixels can be used to importantly improve the calculating-time efficiency of complex-color generation while typically introducing negligible degradation in the perceptible resolution of color detail.

In implementations of the superpixel formulation, the number of pixels assigned to a superpixel has been consistently an even number, and more specifically an integral power of two—just as in the selection of full-density submultiples and pen-height submultiples per pass as mentioned just above.

These developmental facts have flowed naturally from the binary information structure intrinsic to computer science, and accordingly from the customary thinking of software and firmware programming personnel. Thus the Doan patent focuses on use of two-by-two superpixels, each having four pixels; and current development of the technique favors eight-by-eight superpixels, each having sixty-four pixels.

As can now be appreciated, it is a natural extension of this sort of thinking to select even-numbered submultiples of the full inking density, for application in each pass of a pen. In other words, in designing the basic informational architecture of a liquid-ink dot-matrix printing system it seems natural to call for an even number of passes to construct at full density each segment of a desired image.

For instance the Doan patent discloses explicitly half-density (fifty percent) printing per pen pass. That is to say, Doan calls for two passes to obtain full density in each image segment.

It also seems most natural to specify an even number of printing-medium advances to step through the height of the pen-nozzle array. For example Doan also specifies two medium advances per pen swath.

As will shortly be seen, however, use of these numbers imposes limitations, not previously recognized, upon both the quality and the speed of liquid-ink printing—while at the same time, as mentioned above, pressure continues to find new ways to enhance quality, as for example, by spreading ink between passes and into multiple nozzles per pixel row, without undue increase in printing time. Thus important aspects of the technology which is used in the field of the invention are amenable to useful refinement.

SUMMARY OF THE DISCLOSURE

The present invention introduces such refinement. The invention has several aspects or facets, which are amenable to being practiced independently—although for maximum enjoyment and optimization of the benefits of the invention the various facets or aspects are preferably used together.

In its preferred embodiments, the present invention is a method of printing a desired color image on a printing medium by construction from individual ink drops deposited in pixel arrays. Throughout this document except where otherwise plainly indicated by the context, the phrase "color image" encompasses images that include black ink, as well as images printed in black ink exclusively. The method includes the steps of:

passing a multiple-nozzle ink-discharging pen across the printing medium multiple times, each time creating a portion of a respective segment of the desired image; and periodically, advancing the medium so that the pen can create portions of successively different segments of the desired image.

Throughout this document, except where otherwise plainly indicated by the context, reference to "the pen" or "a pen" shall not be taken as suggesting that only a single pen is present. To the contrary, although the invention is fully usable with just one pen, the invention is entirely applicable to systems that employ plural pens and in particular (but not necessarily), to systems having four pens—one loaded with black ink and three with color inks.

In a first of the above-mentioned several aspects of the invention, during each pass, the "portion-creating" function includes discharging from the pen an odd submultiple of the full density of ink desired in the segment of the desired image that is being created by the pen. Throughout this patent, for purposes of the present invention, it is to be understood that the phrase "odd submultiple" excludes the number 1; hence we refer only to the fractions $1/3, 1/5, 1/7, \ldots 1/(2n+1)$, where n is any integer greater than zero.

Thus full density of ink in each segment requires an odd number of passes. Here too by "odd number" we exclude the number 1, and refer only to the numbers $3, 5, 7, \ldots 2n+1$, where as above a represents any integer greater than zero.

The foregoing may be a description or definition of the first aspect of the invention in its broadest or most general terms. Even in such general or broad forms, however, as can now be seen this first aspect of the invention provides a valuable refinement relative to the previously outlined prior art.

In particular this facet of the invention interacts with the previously discussed binary-based information architecture now prevalent in pixel-array liquid-ink printing systems, in a way that is particularly beneficial in helping to spread the application of ink into multiple passes—and thereby in accelerating the drying process. More specifically, odd-submultiple-density inking interacts with the periodicity of superpixels that are made up of an even number of pixels each, in such a way as to create and use a greater number of opportunities for multipass distribution of inking—even within a single pixel row.

This phenomenon may perhaps be most easily grasped by considering a fifty-percent shading of some color, though actually the benefits of the method are not restricted to desired images having any particular data content. In a fifty-percent-density image, within each superpixel a uniform pattern will be established in which every other pixel is printed.

Under these circumstances, if even-submultiple-density (such as half-density) inking is used then typically all the printed pixels will be in one pass and all the unprinted ones in another pass, and then this behavior will repeat. To put it a bit more formally, all the printing will occur in alternating passes exclusively.

Such an arrangement wastes opportunities to spread actual inking among multiple passes. Using the present invention, by contrast, firing of all the ink drops of a given color is far less likely to occur in a single pass.

Regardless of the target percentage fill, because of the manner in which different colors are defined in an eight-by-eight subgrid or superpixel there is a certain pattern of dots that comes into use—and that pattern repeats irrespective of the particular percentage. For instance if there is consistent color across the page or some portion of it, the main color element repeats every eight columns.

Now if the print mode starts in the upper left-hand corner of each superpixel, then in the first pass, for a one-third-density-per-pass system, ink will be fired at the first, fourth, seventh, tenth . . . and successive 1+3nth columns. Considering an overlay of an eight-by-eight superpixel cell on this pattern, it will be realized that different elements of the superpixel cell are operative as the pen proceeds across the row—namely, pixels 1, 4 and 7; then 2, 5 and 8; then 3 and 6; and finally only then again 1 etc.

In other words the pen is not firing to the same dot locations as referenced to the cell. Again, it does not matter what the content is, or which dots are used.

In the example introduced first above it was assumed that the color is consistent across at least a portion of the page. The problem solved by the present invention is not particularly pertinent to variegated-fine-detail images, for excessive patterning normally is not ordinarily troublesome with respect to such images; nonetheless it will be appreciated that the system described here does not introduce any notable drawbacks when used to create such images.

In a three-pass and one-third-density-per pass system, since the periodicities of the superpixel color unit and the printing-medium advance are different, repetitions within each superpixel are impossible. If desired, the relationship between number of pixels per superpixel cell height and (1) the number of nozzles in use over the entire pen height, or (2) the number of pixels per print medium-advance step, can also be selected to prevent repetitions within each swath or subswath (that is to say, the height of each advance step).

It may be pointed out that the previously mentioned predisposition of the computer-science industry for even numbers, and particularly integral powers of two, created what might be called a "blind spot" which heretofore prevented recognition of the usability—not to mention the benefits—of odd-numbered submultiples of fulldensity inking. In other words, prevalent mental habits in the programming industry and profession, while perhaps not teaching away from the use of odd numbers explicitly, represent an environment in which potential benefits of odd-number-based procedures tend to be overlooked.

In a second of the facets or aspects of the invention, the advancing step comprises advancing the medium by an odd submultiple of the height of the segment being created by the pen in each pass. As before, even in this broad or general characterization of the invention distinct benefits may be recognized relative to the prior art.

Specifically, this facet of the invention tends to force the distribution of inking as between multiple nozzles, for each pixel and each pixel row. This enhanced distribution of-the source of ink in each row between multiple nozzles has the special benefits set forth at length in the '882 patent discussed earlier.

Although the benefits of multiple-nozzle inking in each pixel and each row have already been introduced in discussion of the '882 patent, it must now be emphasized that—in a three-advance-per-swath system—three different nozzles will come into play always, in inking of each pixel row. The advantageous departure from excessive evident regularity is thus even more favorably developed.

In a third of its above-mentioned facets, the portion-creating includes creation by the pen of a multiplicity of spaced-apart diagonal lines. Here too even as broadly stated this aspect of the invention represents an important refinement relative to earlier systems, as it resolves more fully the problems addressed by the Lin patent.

This third aspect of the present invention—simply by creating lines that are isolated, or separated—greatly reduces the tendency of ink to run together along diagonals as it does in Lin's checkerboard system. Statistically, in use of the present invention much less connectivity obtains between (or even along) different line segments than in Lin's checkerboard network.

Although the invention thus provides very significant advances relative to the prior art, nevertheless for greatest enjoyment of the benefits of the invention it is preferably practiced in conjunction with certain other features or characteristics which enhance its benefits.

For example, as mentioned earlier it is preferred that the different facets of the invention be practiced in conjunction. For instance, still another advantage accrues from use of a combination one-third-density and three-advance-per-swath system:

In a two-pass system some quality artifacts arise from high levels of inking—now-classical problems of cockle, bleed etc.—and these can be mitigated within the techniques of earlier binary-based operating architectures as for example by substituting four passes for two, but only at the cost of reducing (perhaps typically halving) throughput. In such instances often it will be found that a three-pass system eliminates the drying problems which cannot be solved with two passes—but does so more quickly than possible with four passes (typically by the ratio of numbers of passes, namely 4:3).

In addition it is preferred that the "portion creating" function include using as the odd submultiple of inking density the value one-third, and using as the odd number the value three. It is further preferable that the advancing step include using as the odd submultiple of the height of the segment being created by the pen in each pass the value three.

Accordingly when using these features in conjunction it is preferred that the periodically-advancing step include advancing the medium after substantially every pass of the pen. Further, as certain of the benefits of the invention acquire particular advantageousness when the invention is used with a superpixel system of the sort described, it is therefore preferred that the method include for color-treatment purposes manipulating the pixels of the array in groups—each group having an even number of pixels and being treated as a color unit.

It is also preferred, when spaced-apart diagonal lines are formed according to the third aspect or facet of the invention, that in each passing step after a first one, the "portion creating" function include creating the diagonal lines in positions such as to at least partially fill in unprinted spaces between previously created diagonal lines.

Preferably too the diagonal lines are all at a substantially common angle to a pen-scanning direction. That angle advantageously is forty-five degrees—though other work has shown benefits to substituting an angle of roughly seventy degrees for helping to camouflage mechanical tolerance-derived errors in advancing of the printing medium, as detailed in the above-mentioned related patent document of Lance Cleveland.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

Figure 1:
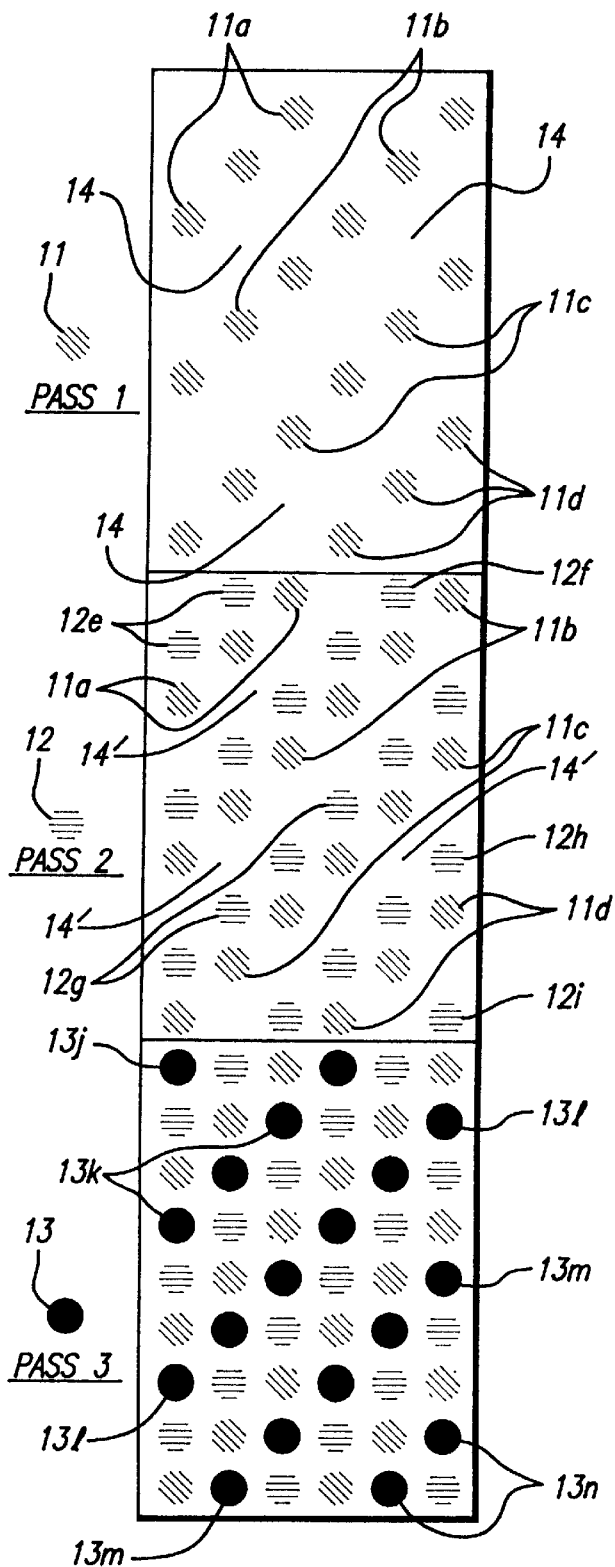
FIG. 1 is a very schematic diagram showing deposited ink-spot patterns at successive moments—or in adjacent subswaths at a single moment—according to preferred embodiments of the invention.

As FIG. 1 shows, according to the present invention liquid ink is discharged into each segment of a desired image during three different passes of the pens; in the first instance the three sections of FIG. 1 may be taken as representing three pen passes over the same, identical segment. The three different ink-spot shadings 11, 12, 13 in the drawing do not represent different colors, or different qualities or characteristics of ink spots—as indeed each ink spot independently can be of any color which the system is capable of creating—but rather the three shadings simply identify which pen pass is used to form each spot.

Thus all the spots having the first shading 11 are laid down during a first pass, and as can be seen from the first (top) section of the drawing these spots 11 are placed to form diagonal lines that are mutually separated. That is, all the spots 11*a* form a portion of a first diagonal line, all the spots 11*b* form a portion of a second such line, all the spots 11*c* form a portion of a third, and the spots 11*d* form a portion of a fourth; and it will be understood that these markings represent schematically only a very small part of an image occupying an overall page, sheet or grid.

Preferably in accordance with the invention these four representative lines 11*a*, 11*b*, 11*c*, 11*d* are not only separated from each other but separated by diagonal strips 13, each more than one unprinted pixel position wide.

Similarly the spots having the second shading 12—seen in the second (central) part of the drawing—are laid down during a separate, second, pass and subgrouped into portions 12*e*, 12*f*, 12*g*, 12*h* and 12*i* of respective diagonal lines, generally as in the first section of the drawing, but occupying part of each previously unprinted double-width diagonal strip 13. Thus these spots 12 too are formed into diagonal lines now isolated by strips of width more than one pixel position each—from one another, but not from the spots 12 formed in the first pass.

Indeed the two groups of diagonal lines lie adjacent to each other in pairs 11*a*–12*e*, 11*b*–12*f*, 11*c*–12*g* and 11*d*–12*h*—but leaving still unprinted one-pixel-wide diagonal spaces or strips 14 for yet another set of diagonals. As will be understood, the single remaining second-pass spot 12*i* in the drawing is part of a second-pass diagonal line that lies adjacent to still another first-pass line (not shown) etc.

The remaining set of spots 13 is created in a third pass as shown in the last (bottom) section of the drawing. Those spots 13 do in fact form additional diagonal lines 13*k*, 13*l*, 13*m* and 13*n* of spots—as well as an additional diagonal line represented fragmentarily by a remaining spot 13*j*—to fill the diagonal strips 14 left unprinted after the first two passes.

Thus FIG. 1 particularly illustrates the odd-submultiple-density and diagonal-line-masking aspects of the invention, particularly with regard to the preferred embodiment in which the value of the odd submultiple is one-third. As noted earlier, FIG. 1 can be regarded initially as representing just one segment of an image at three different instants—namely, immediately after three successive pen passes.

Figure 2:
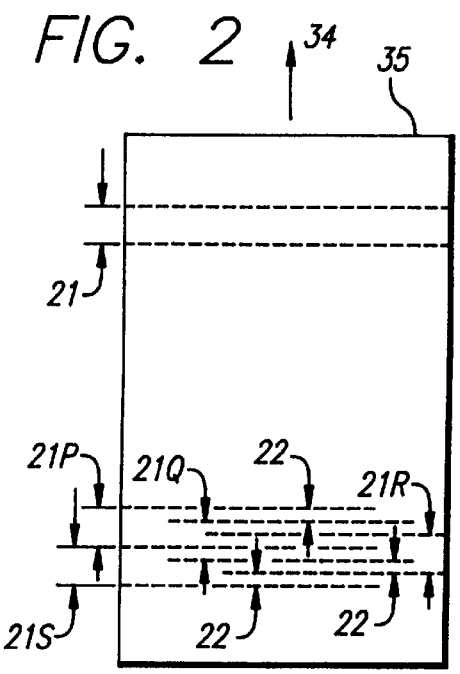
FIG. 2 is another diagram representing the longitudinal pattern of printing-medium advances in relation to effective pen or nozzle-array height.

FIG. 2 shows the odd-submultiple-swath advance facet of the invention, for the preferred case in which that value too is one-third. In that drawing, the effective full height 21 of the pen nozzle array, or full-swath segment, is effectively subdivided into thirds by the printing-medium advance distance 22.

As shown in the lower part of the drawing, a full swath is formed on the medium 35 at each of numerous successive positions 21P, 21Q, 21R, 21S, . . . as the medium moves in a longitudinal direction 34, and these swaths are mutually overlapping by the one-third advance distances 22. The operation of each pen in coordination with this medium-advance arrangement may be further understood by imposing a different interpretation upon FIG. 1.

In particular FIG. 1 can now be taken as representing three immediately adjacent subswaths—that is to say, the three different parts of a single pen swath—at a single moment, namely immediately after the pen has completed a pass across some part of the image other than that which is created by the first two passes. Thus FIG. 1 when so regarded represents a snapshot of the progressive or propagating development of full inking along the growing edge of the image.

For purposes of this interpretation it will be understood that the number of pixel rows per one-third swath modernly will be some relatively large number such as thirty-two. The nine pixel rows in each section of FIG. 1 simply are schematically representative of such a larger number.

It is to be understood that the several swaths represented in FIG. 2 (and the several subswaths in this second interpretation of FIG. 1) may be taken as, in each case, relative to just one single pen. That is, the patterns shown for successive swaths are replicated for each different-color pen in the printing machine; FIG. 1, however, as noted earlier represents the overall printed array resulting from operation of all the pens.

Figure 3:
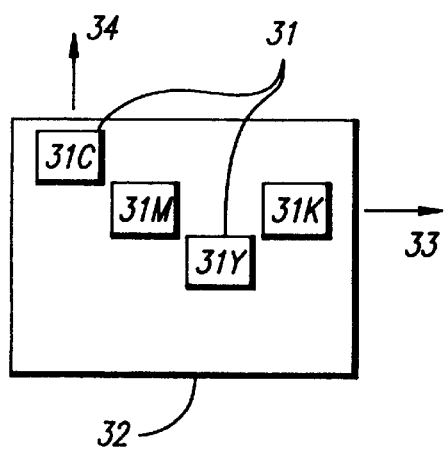
FIG. 3 is a highly schematic plan view of a multiple-pen carriage for use in implementing the invention.

FIG. 3 shows that preferably the pens 31 are four in number, and staggered on the carriage 32 to minimize the amount of ink per unit area that is placed on the page in each pen-carriage pass. Inks loaded into the pens are preferably black 31K, yellow 31Y, magenta 31M and cyan 31C.

Figure 4:
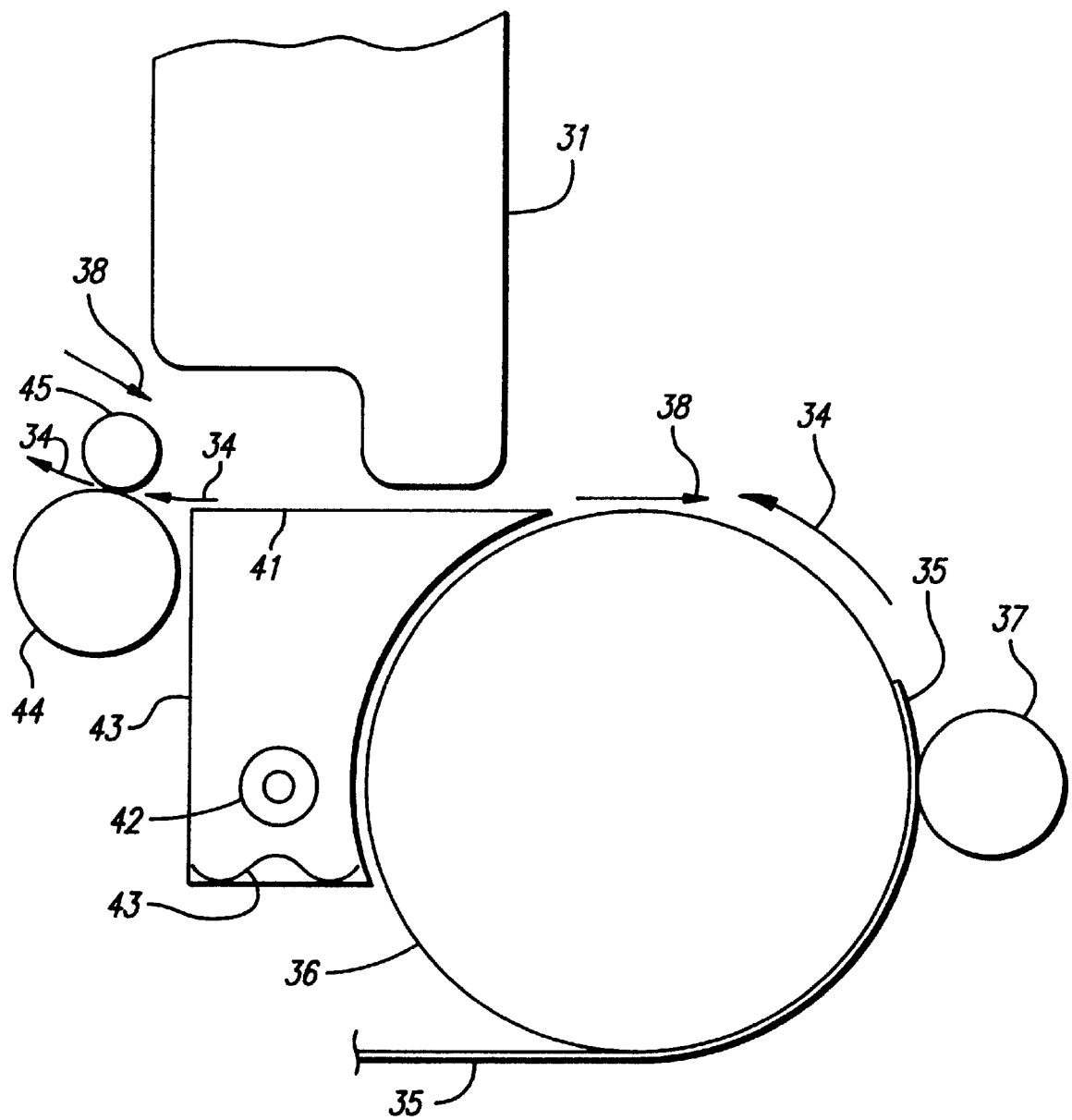
FIG. 4 is a mechanical diagram showing the printing-medium advance path in a preferred apparatus for practice of the invention.

In this particular apparatus, the carriage 32 scans in the direction indicated by the arrow 33, which is transverse to the direction of printing-medium advance 34 (FIG. 4). The print medium 35 is driven by an input roller 36 and pinch wheel 37; the drive roller is heated to preheat the medium 35 and thereby reduce shrinkage during the actual printing.

Air flow 38 through the machine is opposed to the direction of print-medium motion, beginning a moisture-removal process while the medium is still at the drive roller 36. Upon leaving that roller the medium proceeds under the pens 31 and over a backup plate 41, which is also heated—by a heat lamp 42 and inner reflectors 43—and thence to a tensioning exit roller 44 and star wheel 45.

As further set forth in the two parent patent applications identified earlier, the use of staggered pens 31 on the carriage 32 is facilitated by incorporation of an optical ink-drop-sensing system that provides information needed for precise measurement of the actual stagger distances as between the several pens. This sensing and measurement system obviates the need for ultrafine mechanical tolerances in relative positioning of the pens.

It will be understood that the foregoing disclosure is intended to be merely exemplary, and not to limit the scope of the invention—which is to be determined by reference to the appended claims.

What is claimed is:

1. A method of printing, comprising:

passing a multiple-nozzle ink-discharging pen across a print medium multiple times to facilitate creating a segment portion of a full ink density image;

discharging from the pen during each pass, an odd sub-multiple of the full ink density required by said segment portion so that formation of said full ink density segment portion of the image always requires an odd number of passes; and periodically, advancing the medium so that successively different segment portions of the image are formed on the print medium.

2. A method of printing, comprising:

passing an odd number of staggered pen cartridges across a sheet of ink receiving material, an odd number of passes to create a segment portion of a full ink density image;

discharging from the odd number of staggered pen cartridges during each pass, an odd sub-multiple of the full ink density required by said segment portion so that formation of said full ink density segment portion of the image always requires said odd number of passes;

advancing said sheet of ink receiving material, during each of an odd number of sheet advancing periods, an incremental distance so that successively different segment portions of the image are formed on the sheet of ink receiving material;

wherein said incremental distance the sheet of ink material is advanced during each individual advancing period, is an insufficient distance to facilitate the forming of said full ink density segment portion of the image; and wherein said incremental distance the sheet of ink receiving material is advance during said odd number of sheet advancing period, is a sufficient distance to facilitate the forming of said full ink density segment portion of the image.

3. A method of printing according to claim 2, wherein each individual pen cartridge in said odd number of pen cartridges includes an array of nozzles for facilitating the ejecting of droplets onto the sheet of ink receiving material; and wherein the nozzle arrays disposed in said set of staggered pen cartridges are configured to provide non overlapping droplets during each pass of the pen cartridges across said sheet of ink receiving material.

4. A method of printing, comprising:

depositing on a sheet of ink receiving material, during each of an odd number of pen passes across said sheet of ink receiving material, a sufficient quantity of ink droplets to facilitate creating a segment portion of a full ink density image;

wherein said quantity of ink droplets deposited during each individual pen pass across said sheet of ink receiving material is an insufficient quantity to form an individual segment portion of said full ink density image;

wherein said quantity of ink droplets deposited during said odd number of pen passes is a sufficient quantity to form said individual segment portion of said full ink density image;

periodically, advancing said sheet of ink receiving material so that successively different segment portions of the full ink density image are formed on the sheet of ink receiving material; and wherein said step of depositing includes:
discharging an odd sub multiple of the full ink density required by said segment portion so that formation of said full ink density segment portion of the image always requires an odd number of passes.

5. A method of printing according to claim 4, further comprising:

advancing said sheet of ink receiving material, during each of an odd number of sheet advancing periods, an incremental distance;

wherein said incremental distance the sheet of ink receiving material is advanced during each individual advancing period, is an insufficient distance to facilitate the forming of said individual segment portion of said full ink density image; and wherein said incremental distance the sheet of ink receiving material is advanced during said odd number of sheet advancing periods, is a sufficient distance to facilitate the forming of said individual segment portion of said full ink density image.

6. A method of printing according to claim 5, wherein said incremental distance said sheet of ink receiving material is advanced during each advancing period, is an odd submultiple number of the total distance said sheet of ink receiving material is advanced during said odd number of sheet advancing periods.

7. A method of printing according to claim 6, wherein said odd submultiple number is one third of the total distance said sheet of ink receiving material is advanced during said odd number of sheet advancing periods.

8. A method of printing according to claim 7, wherein said quantity of ink droplets deposited during a first pen pass of said odd number of pen passes across said sheet of ink receiving material, is a sufficient quantity to provide a first group of desired pixels in at least a portion of an individual segment of pixels each having a desired ink density.

9. A method of printing according to claim 8, wherein said quantity of ink deposited during an even number of said odd number pen passes across said sheet of ink receiving material, is another sufficient quantity to provide a second group of desired pixels in said at least a portion of an individual segment of pixels each having a desired ink density and another first group of desired pixels in at least a second portion of an individual segment of pixels each having a desired ink density.

10. A method of printing according to claim 9, wherein said quantity of ink deposited during a last pen pass of said odd number of pen passes across said sheet of ink receiving material is yet another sufficient quantity to provide a third group of desired pixels in said at least a portion of said individual segment of pixels each having a desired ink density and said another second group of desired pixels in said at least a second portion of said individual segment of pixels each having a desired ink density and yet another first group of desired pixels in at least a third portion of an individual segment of pixels each having a desired ink density.

11. A method of printing according to claim 10, wherein said first group of desired pixels are deposited in a set of spaced apart diagonal lines disposed within said at least a portion of an individual segment of pixels each having a desired ink density.

12. A method of printing according to claim 11, wherein said second group of desired pixels are deposited in another set of spaced apart diagonal lines interleaved with said first group of desired pixels disposed within said at least a portion of an individual segment of pixels each having a desired ink density.

13. A method of printing according to claim 12, wherein said third group of desired pixels are deposited in still yet another set of spaced apart diagonal lines interleaved between said first group and said second group of desired pixels disposed within said at least a portion of an individual segment of pixels each having a desired ink density.

* * * * *